US011355107B2

(12) United States Patent
Cheng et al.

(10) Patent No.: US 11,355,107 B2
(45) Date of Patent: Jun. 7, 2022

(54) VOICE SMART DEVICE WAKE-UP METHOD, APPARATUS, DEVICE AND STORAGE MEDIUM

(71) Applicant: Baidu Online Network Technology (Beijing) Co., Ltd., Haidian District Beijing (CN)

(72) Inventors: Gaofei Cheng, Haidian District Beijing (CN); Qin Xiong, Haidian District Beijing (CN); Leilei Gao, Haidian District Beijing (CN); Yan Zhang, Haidian District Beijing (CN); Fei Wang, Haidian District Beijing (CN)

(73) Assignees: BAIDU ONLINE NETWORK TECHNOLOGY (BEIJING) CO., LTD., Haidian District Beijing (CN); SHANGHAI XIAODU TECHNOLOGY CO. LTD., Shanghai (CN)

(*) Notice: Subject to any disclaimer, the term of this patent is extended or adjusted under 35 U.S.C. 154(b) by 308 days.

(21) Appl. No.: 16/514,925

(22) Filed: Jul. 17, 2019

(65) Prior Publication Data
US 2019/0341049 A1 Nov. 7, 2019

(30) Foreign Application Priority Data
Aug. 31, 2018 (CN) .......................... 201811015349.7

(51) Int. Cl.
*G10L 15/20* (2006.01)
*G10L 25/03* (2013.01)
(Continued)

(52) U.S. Cl.
CPC ............ *G10L 15/22* (2013.01); *G06F 1/3206* (2013.01); *G06F 1/3246* (2013.01); *G06F 3/167* (2013.01);
(Continued)

(58) Field of Classification Search
USPC .... 379/1.01–14.01, 15.02–39; 704/200–275; 719/311–332
See application file for complete search history.

(56) References Cited

U.S. PATENT DOCUMENTS

| 9,548,053 B1* | 1/2017 | Basye .................. G06F 16/683 |
| 2010/0125735 A1* | 5/2010 | Zapata .................... H04L 63/08 |
| | | 713/170 |

(Continued)

FOREIGN PATENT DOCUMENTS

| CN | 102387501 A | 3/2012 |
| CN | 106469040 A | 3/2017 |

(Continued)

OTHER PUBLICATIONS

Search Report dated Nov. 20, 2019 regarding Application No. 201811015349.7 ; 12 pages.
(Continued)

*Primary Examiner* — Marcellus J Augustin
(74) *Attorney, Agent, or Firm* — Tucker Ellis LLP; Tanya S. Gaylord (57) ABSTRACT

Embodiments of the present disclosure provide a voice smart device wake-up method, apparatus, device and storage medium. The method includes: receiving, by a master control device, a wake-up message sent by each smart device, the wake-up message comprising at least sound characteristics information, determining, by the master control device, a target smart device to be woken up according to the sound characteristics information, and sending, by the master control device, a wake-up instruction to the target smart device to be woken up, to wake up the target smart device to be woken up for responding to a voice request from a user. In a case where a plurality of smart devices share a same
(Continued)

wake-up word, only one most suitable smart device is waken up to respond to a voice request of the user each time.

20 Claims, 5 Drawing Sheets (51) Int. Cl.
  G10L 21/0272 (2013.01)
  G10L 15/22 (2006.01)
  G06F 1/3206 (2019.01)
  G06F 1/3246 (2019.01)
  G06F 3/16 (2006.01)
  G10L 15/08 (2006.01)

(52) U.S. Cl.
  CPC ........ *G10L 15/08* (2013.01); *G10L 2015/088* (2013.01); *G10L 2015/223* (2013.01)

(56) References Cited

U.S. PATENT DOCUMENTS

| | | | |
|---|---|---|---|
| 2012/0054493 A1 | 3/2012 | Bradley | |
| 2018/0096690 A1* | 4/2018 | Mixter | G06F 21/32 |
| 2018/0108247 A1* | 4/2018 | Chiarizio | H04B 1/713 |
| 2018/0158449 A1 | 6/2018 | Tang | |
| 2019/0019504 A1* | 1/2019 | Hatambeiki | G10L 15/22 |
| 2019/0147904 A1* | 5/2019 | Tao | G10L 15/08 |
| | | | 704/231 |
| 2021/0082431 A1* | 3/2021 | Zhou | G10L 15/02 |

FOREIGN PATENT DOCUMENTS

| | | |
|---|---|---|
| CN | 106952646 A | 7/2017 |
| CN | 107919119 A | 4/2018 |
| CN | 108259280 A | 7/2018 |
| CN | 108337601 A | 7/2018 |
| JP | 2012050096 A | 3/2012 |
| JP | 2017107333 A | 6/2017 |
| JP | 2017520008 A | 7/2017 |
| JP | 2018036397 A | 3/2018 |
| JP | 2018512619 A | 5/2018 |
| JP | 2019091005 A | 6/2019 |

OTHER PUBLICATIONS

CNBLUSP201904529—The first Office Action of parallel JP application dated Aug. 26, 2020; 6 pages.

* cited by examiner

VOICE SMART DEVICE WAKE-UP METHOD, APPARATUS, DEVICE AND STORAGE MEDIUM

CROSS-REFERENCE TO RELATED APPLICATION

This application claims priority to Chinese Patent Application No. 201811015349.7, filed on Aug. 31, 2018, which is hereby incorporated by reference in its entirety.

TECHNICAL FIELD

The present disclosure relates to the technical field of voice smart devices and, in particular, to a voice smart device wake-up method, apparatus, device, and storage medium.

BACKGROUND

As voice smart devices (hereinafter referred to as smart devices) increases, multiple smart devices of the same manufacturer may exist in one home. For example, a smart speaker, a smart television, a smart air conditioner and the like. These smart devices often have the same wake-up word, such as the wake-up word "Xiaodu Xiaodu". When the user says "Xiaodu Xiaodu", each smart device will be woken up, starts to receive the user's voice and responds according to the content of the user's speech. Multiple smart devices respond at the same time causes mutual interference, bringing a relative poor experience to the user.

In the prior art, by allowing the user to define a different wake-up word for each smart device, it is necessary for the user to remember the wake-up words for each of the smart devices, thereby causing inconvenience to the user's use.

SUMMARY

The present disclosure provides a voice smart device wake-up method, apparatus, device and storage medium, to solve the problem in the prior art that a plurality of smart devices are woken up simultaneously, by using one wake-up word, to response to a user's voice request, which results in defects such as mutual interference and poor user experiences.

A first aspect of the present disclosure provides a voice smart device wake-up method, including:

receiving, by a master control device, a wake-up message sent by each smart device, the wake-up message including at least sound characteristics information, determining, by the master control device, a target smart device to be woken up according to the sound characteristics information, and sending, by the master control device, a wake-up instruction to the target smart device to be woken up, to wake up the target smart device to be woken up for responding to a voice request from a user.

A second aspect of the present disclosure provides a voice smart device wake-up method, including:

sending, by a second smart device, a wake-up message to a master control device when receiving a wake-up signal from a user, so that the master control device determines a target smart device to be woken up based on sound characteristics information included in the wake-up message from each smart device, receiving, by the second smart device, a wake-up instruction sent by the master control device if the second smart device is determined as the target smart device to be woken up, and receiving and responding to, by the second smart device, a voice request from the user according to the wake-up instruction.

A third aspect of the present disclosure provides a voice smart device wake-up apparatus, comprising:

a first receiving module for a master control device to receive a wake-up message sent by each smart device, the wake-up message including at least sound characteristics information, a first processing module for the master control device to determine a target smart device to be woken up according to sound characteristics information, and a first sending module for the master control device to send a wake-up instruction to the target smart device to be woken up, to wake up the target smart device to be woken up for responding to a voice request from a user.

A fourth aspect of the present disclosure provides a voice smart device wake-up apparatus, comprising:

a second sending module for a second smart device to send a wake-up message to a master control device when receiving a wake-up signal from a user, so that the master control device determines a target smart device to be woken up based on sound characteristics information included in the wake-up message from each smart device, a second receiving module for the second smart device to receive a wake-up instruction sent by the master control device if the second smart device is determined as the target smart device to be woken up, and a second processing module for the second smart device to receive and respond to a voice request from the user according to the wake-up instruction.

A fifth aspect of the present disclosure provides a smart device including at least one processor and a memory, the memory storing a computer program, and the at least one processor executing the computer program stored in the memory to implement the method provided in the first aspect.

A sixth aspect of the present disclosure provides a smart device including at least one processor and a memory, the memory storing a computer program, and the at least one processor executing the computer program stored in the memory to implement the method provided in the second aspect.

A seventh aspect of the present disclosure provides a computer readable storage medium storing a computer program, the computer program being executed to implement the method provided in the first aspect.

An eighth aspect of the present disclosure provides a computer-readable storage medium storing a computer program, the computer program being executed to implement the method provided in the second aspect.

According to the voice smart device wake-up methods, apparatus, devices, and storage mediums provided in the present disclosure, when the user speaks the wake-up word, multiple smart devices send wake-up messages to a master control device, and the master control device determines a target smart device to be woken up for responding to a subsequent voice request of the user. In a case in which the multiple smart devices share a same wake-up word, only one most suitable smart device is woken up for responding to the voice request of the user each time. This resolves a problem in the prior art that one wake-up word wakes up multiple smart devices, resulting in problems of mutual interference between the smart devices and the relative poor user experience, thereby effectively improving user experience.

BRIEF DESCRIPTION OF DRAWINGS

In order to more clearly illustrate the embodiments of the present disclosure or the technical solutions in the prior art, the drawings used in the embodiments or the description of the prior art will be briefly described below. Obviously, the drawings in the following description are merely some embodiments of the present disclosure, and other drawings can be acquired from these drawings by the person ordinarily skilled in the art without inventive work.

Specific embodiments of the present disclosure have been described in the above drawings, for which more detailed descriptions will be made later. These drawings and text descriptions are not intended to limit the scope of the present disclosure in any way, but to explain concepts of the present disclosure to persons skilled in the art with reference to the specific embodiments.

DESCRIPTION OF EMBODIMENTS

In order to make the objects, technical solutions and advantages of the embodiments of the present disclosure clearer, the following clearly and completely describes the technical solutions of the embodiments of the present disclosure in conjunction with the accompanying drawings in the embodiments of the present disclosure. Clearly, the described embodiments are part rather than all of the embodiments of the present disclosure. Based on the embodiments of the present disclosure, all other embodiments obtained by those of ordinary skill in the art without creative efforts fall within the scope of the protection of the present disclosure.

The nouns to which this application relates are first explained:

The raft algorithm, refers to a consistency algorithm in which Raft divides nodes in a cluster (which may be referred to as smart devices in the present disclosure) into three states: Leader (leader, which refers to the master control device in the present disclosure), Follower (follower, which refers to other smart devices other than the master control device in the present disclosure) and Candidate (candidate, which refers to each smart device to be selected in the process of selecting the master control device in the present disclosure) and, of course, the responsibilities of these states are different. Only two states, Leader and Follower, exist when the Raft is running for providing service. Leader: taking responsible for the synchronization management of the log, and maintaining a heartbeat connection with Follower. Follower: upon start-up, all nodes are in the Follower state, responding to the log synchronization request of the Leader, and forwarding the request to the Follower to the Leader in response to the request of the Candidate. Candidate: taking responsible for the election vote, upon start-up, Raft initiates the election by converting a node from Follower to Candidate, selects a Leader from Candidate and then converts it to Leader state.

Figure 1:
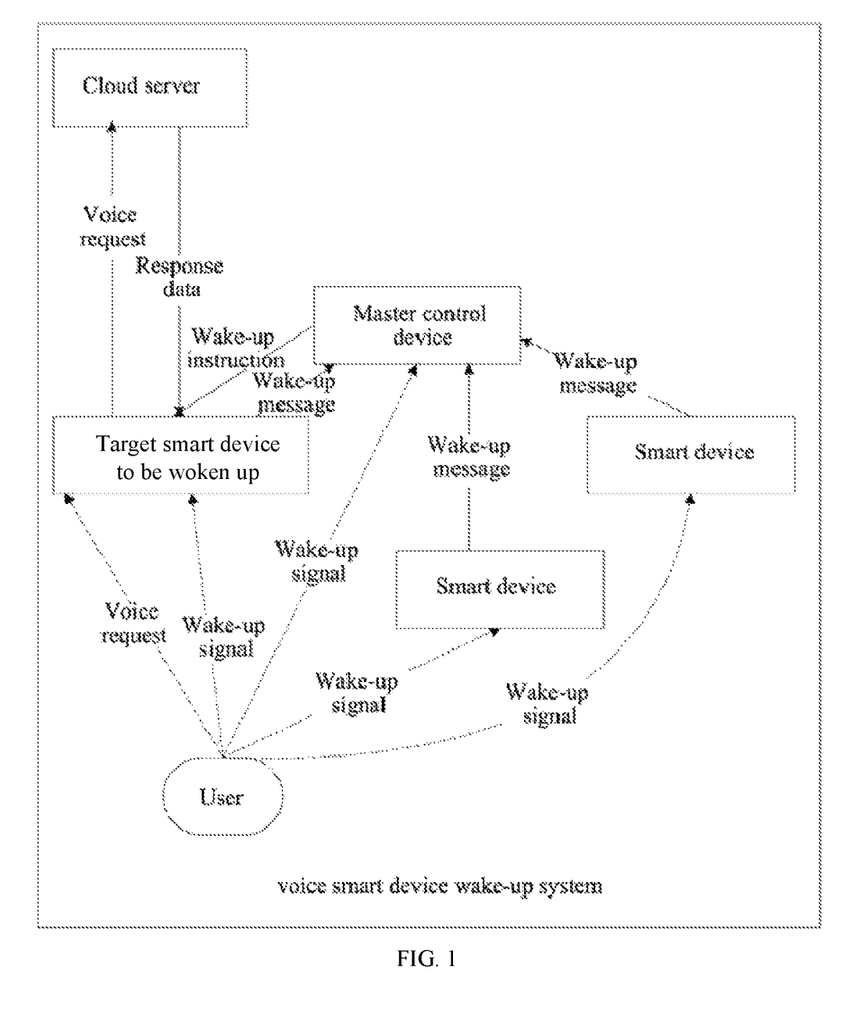
FIG. 1 is a schematic structural diagram of a voice smart device wake-up system applicable to an embodiment of the present disclosure.

The voice smart device wake-up method according to an embodiment of the present disclosure is applicable to the following system for waking up a voice smart device as shown in FIG. 1, which is a schematic structural diagram a voice smart device wake-up system to which the embodiment of the present disclosure is applicable. The voice smart device wake-up system includes a plurality of smart devices, which access the same local area network and have the same wake-up word, and selects one of the smart devices as the master control device in a certain manner while taking the other smart devices as slave control smart devices. When the user sends a wake-up signal, such as the user says the wake-up word, each smart device (which may also include the master control device) receives the wake-up signal of the user, but is not woken up, that is, each smart device does not directly respond to the user's voice request, but sends a wake-up message to the master control device, so that the master control device determines the target smart device to be woken up, and wakes up the target device to be woken up for responding to the voice request of the user. The target smart device to be woken up may send the voice request of the user to the cloud server, and obtain response data from the cloud server to respond to the voice request of the user. In this way, the user can wake up the most suitable smart device to respond to the user's voice request by only remembering one wake-up word, which solves problems in the prior art that, one wake-up word wakes up multiple smart devices, resulting in mutual interference between the smart devices and poor user experience.

In addition, the terms such as "first" and "second" are only used for facilitating the description, and shall not be interpreted as to indicate or imply the relative importance or implicated indicate the amount of mentioned technical features. In the description of the following embodiments, the meaning of "multiple" is two or above unless otherwise specifically defined.

The following specific embodiments may be combined with each other, and the same or similar concepts or processes may not be repeated in some embodiments. Embodiments of the present disclosure will now be described with reference to the accompanying drawings.

Embodiment 1

The present embodiment provides a voice smart device wake-up method, used for waking up a smart device for the user. The execution body of the present embodiment is a voice smart device wake-up apparatus, which may be disposed in the smart device.

Figure 2:
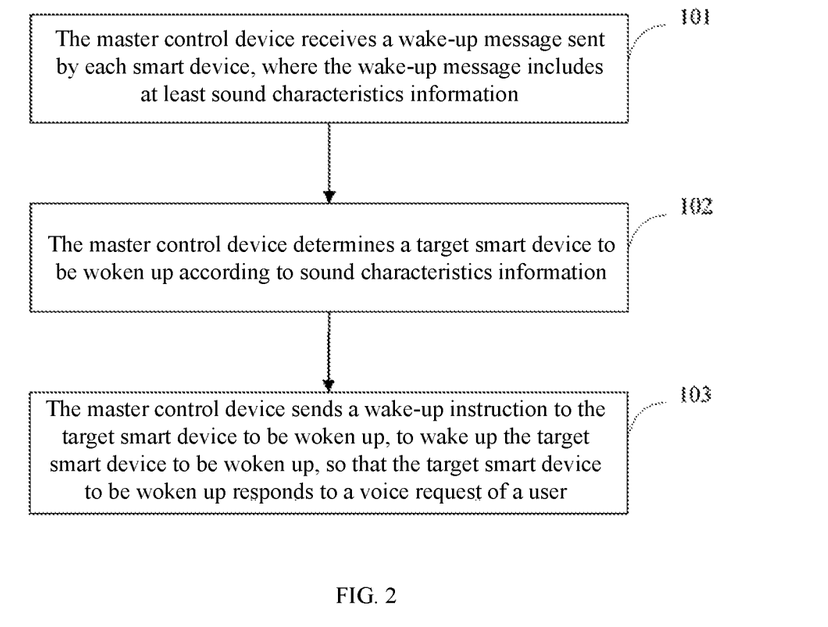
FIG. 2 is a schematic flowchart of a voice smart device wake-up method according to an embodiment of the present disclosure.

As shown in FIG. 2, which is a schematic flowchart of a voice smart device wake-up method according to an embodiment, the method includes the following steps:

Step 101, the master control device receives a wake-up message sent by each smart device, where the wake-up message includes at least sound characteristics information.

Step 102, the master control device determines a target smart device to be woken up according to sound characteristics information.

Step 103, the master control device sends a wake-up instruction to the target smart device to be woken up, to wake up the target smart device to be woken up, so that the target smart device to be woken up responds to a voice request of a user.

In particular, a plurality of smart devices may access the same local area network and may have the same wake-up word. One of the smart devices is selected as the master control device in a certain manner, and the other smart devices act as slave control smart devices. When a user issues a wake-up signal, such as speaking a wake-up word, the smart devices (including the master control device) receiving a wake-up signal of the user are not woken up, that is, the smart devices do not directly respond to the user's voice request, but generate wake-up messages according to the wake-up signal, where the wake-up message includes at least sound characteristics information such as a volume intensity, a distance information and a tone. The volume intensity refers to the volume intensity of the user's wake-up signal received by the smart device, and the volume intensity may represent the distance between the smart device and the user. Distance information refers to information of distance between the smart device and the user determined by the smart device corresponding to the wake-up message according to the wake-up signal sent by the user. For example, one smart device has a high volume intensity and another smart device has a low volume intensity, which may identify that a smart device with a high volume intensity is closer to a user than a smart device with a low volume intensity. The way in which the smart device obtains the volume intensity of the wake-up signal according to the wake-up signal of the user may be any implementation manner in the prior art, and details are not described herein again.

Each smart device sends the wake-up message to the master control device after generating the wake-up message. The master control device may receive a wake-up message sent by each smart device. The master control device, based on the receipt of the first wake-up message, takes the wake-up messages received within the preset duration (such as 500 ms, which may be set according to actual requirements) as the same wake-up.

After receiving the wake-up message sent by each smart device, the master control device determines a target smart device to be woken up from the smart devices (also including the master control device itself, and the master control device itself generates a wake-up message to participate in the selection of the target smart device to be woken up) according to the sound characteristics information. Specifically, the master control device may select the smart device with the highest volume intensity as the target smart device to be woken up according to the volume intensity value, or may select the smart device with the closest distance as the target smart device to be woken up according to the distance information, or may determine the target smart device to be woken up according to other sound characteristics information, which may be specifically set according to an actual requirement, which is not limited in this embodiment.

After determining that the target is woken up by the smart device, the master control device sends a wake-up instruction to the target smart device to be woken up for waking it up.

After receiving the wake-up instruction, the target smart device to be woken up receives the user's voice request according to the wake-up instruction and responds to the voice request. Specifically, the target smart device to be woken up may send the voice request of the user to the cloud server. The cloud server obtains response data according to the voice request of the user and returns the response data to the target smart device to be woken up. The target smart device to be woken up plays the response data to the user. For example, the voice request of the user is "How is the weather today?", the cloud server obtains today's weather information and sends the weather information to the target smart device to be woken up, so that the target smart device to be woken up plays it to the user. Alternatively, the target smart device to be woken up may acquire response data according to the voice request of the user and play the response data to the user or perform corresponding setting or processing according to the voice request of the user. For example, the voice request of the user is "Please set the alarm clock to 10 am for me, and the content of the alarm clock is meeting friends", and the target smart device to be woken up sets the alarm clock according to the voice request of the user, and announces the alarm clock to the user at a specified time.

The playback mode for responding to the user request by the target smart device to be woken up may be set according to actual requirements, such as displaying on the screen in a text form, playing in a voice form, or playing in a voice form while displaying on the screen, which is not limited in this embodiment.

Alternatively, the master control device may also send a non-wake-up instruction to smart devices other than the target smart device to be woken up to indicate that the other smart devices not to receive the user's voice request, and not to respond to the user's voice request.

Alternatively, it may be agreed that the smart device will not be woken up as long as no wake-up instruction is received, so that the master control device does not need to send a non-wake-up instruction to other smart devices.

In response to a user's voice request, the request content of the user's voice request may be obtained by using a technology such as voice recognition and semantic recognition, the specific process of which is the prior art, and details thereof are not described in this embodiment.

According to the voice smart device wake-up method provided in this embodiment, when a user gives a wake-up word, a plurality of smart devices send a wake-up message to the master control device, and the master control device determines the target smart device to be woken up for responding to a subsequent voice request of the user, thereby realizing waking up only one most suitable smart device for responding to the user's voice request in a case where a plurality of smart devices share a same wake-up word. This resolves a problem in the prior art that one wake-up word wakes up multiple smart devices, causing mutual interference between the smart devices which results in poor user experience, and thus effectively improves user experience.

Embodiment 2

The present embodiment further supplements the method provided in Embodiment 1.

Figure 3:
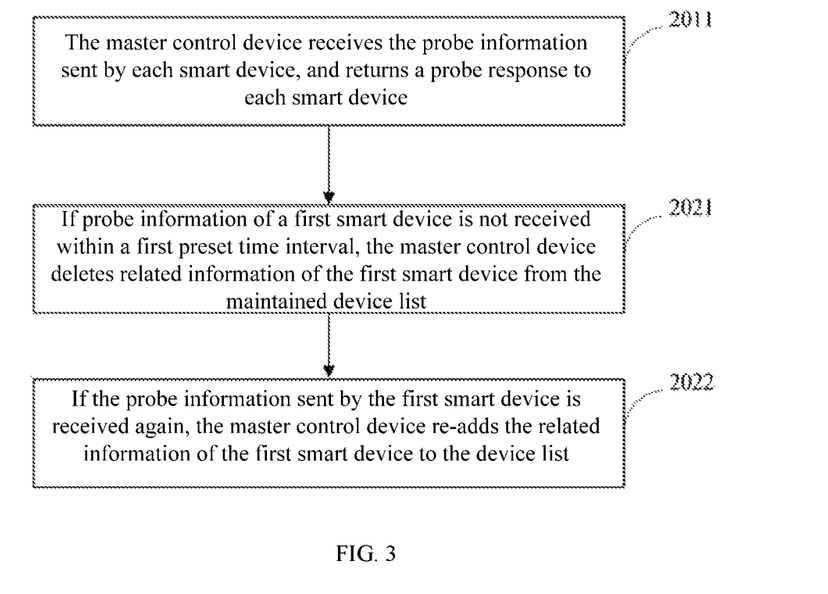
FIG. 3 is a schematic flowchart of a voice smart device wake-up method according to another embodiment of the present disclosure.

FIG. 3 is a schematic flowchart of a voice smart device wake-up method according to an embodiment.

In an implementable manner, on the basis of the first embodiment, alternatively, after the master control device is selected, the method may further include:

Step 2011, the master control device receives the probe information sent by each smart device, and returns a probe response to each smart device.

Specifically, the master control device is not fixed, and has a certain period. After selecting a master control device, each smart device needs to send detection information to the master control device at a certain time interval (that is, a second preset time interval, such as every 1 second and every 2 seconds, which may be set according to an actual requirement). If a detection response returned by the master control device can be received, it is proved that the master control device works normally. If no probe response is received for a preset number of times (such as three times, four times, five times, etc., which may be set according to an actual requirement), it is considered that the master control device fails, and each smart device needs to re-select a new master control device. The period from selecting a master control device to deeming the master control device as a fault may be referred as a cycle.

Alternatively, the selection of the master control device by each smart device may be performed in a time sequence in which the smart devices are added to the local area network, or may be performed by using a raft algorithm. Specifically, the method of selecting the master control device by using the raft algorithm may be any of the possible implementations in the prior art, which is not limited in this application.

Alternatively, the method may further include:

Step 2021, if probe information of a first smart device is not received within a first preset time interval, the master control device deletes related information of the first smart device from the maintained device list.

Specifically, the master control device monitors the online (i.e., normal working) smart devices in the local area network in real time, maintains a device list, and maintains relevant information of the current online smart device in the device list (e.g., identification information and status of the smart device, which may be specifically set according to actual requirements). The master control device determines whether or not the smart devices are online by the probe information sent by the smart devices. If the detection information of the first smart device is not received within the first preset time interval (e.g., 5 seconds, 6 seconds, etc.), it is considered that the first smart device is faulty. The master control device deletes the related information of the first smart device from the maintained device list, or may change the state of the first smart device to a fault. In order to ensure that it will not be determined as the target smart device to be woken up during its failure.

The number of first smart device(s) may be one or more.

Alternatively, after the master control device removes the related information of the first smart device from the maintained device list, the method may further include:

Step 2022, if the probe information sent by the first smart device is received again, the master control device re-adds the related information of the first smart device to the device list.

Specifically, if the probe information sent by the first smart device is received after a period of time after determining the first smart device as faulty, it indicates that the first smart device is operating normally, and the master control device may add the related information of the first smart device to the device list. Alternatively, the state of the first smart device is changed from a fault to a normal state so that the first smart device can subsequently participate in a determination process of the target smart device to be woken up.

In another possible implementation, on the basis of above-described Embodiment 1, alternatively, the sound characteristic information may include a volume intensity. Step 102 may specifically include determining, by the master control device, a target smart device to be woken up according to the volume intensity. Specifically, the smart device corresponding to the wake-up message with the strongest volume intensity may be determined as the target smart device to be woken up according to the volume intensity.

In another possible implementation, on the basis of the above-described Embodiment 1, alternatively, the sound characteristic information includes distance information, which is the information of distance between the user and the smart device corresponding to the wake-up message determined by the smart device itself according to the wake-up signal sent by the user. Step 102 may include:

Step 1021, the master control device determines the target smart device to be woken up according to the distance information.

Specifically, for each smart device, after receiving the wake-up signal of the user, the smart device may further determine the distance information between the user and the smart device according to the wake-up signal. A specific manner of determining the distance information may be any of the sound source positioning manners that can be implemented in the prior art, which is not limited in this embodiment. The smart device may send a wake-up message generated from the distance information of the wake-up signal of the user to the master control device, and may also send a wake-up message generated from the volume intensity as well as the distance information of the wake-up signal of the user to the master control device, that is, the wake-up message includes both the volume intensity and the distance information. The master control device may also sort the smart devices and select the target smart device to be woken up according to the distance information included in the wake-up message of each smart device. Of course, the selection may be performed on the basis of volume intensity. A specific manner may be set according to an actual requirement, which is not limited in this embodiment.

In still another possible implementation, on the basis of the first embodiment, alternatively, after step 102, the method may further include:

Step 2031, the master control device sends a non-wake-up instruction to the other smart devices to indicate not to wake up the other smart devices.

In particular, the master control device may also send a non-wake-up instruction to smart devices other than the target smart device to be woken up to instruct other smart devices not to receive a user's voice request, and not to respond to a user's voice request.

It should be noted that each possible implementation of the embodiment may be implemented separately, and may also be implemented in any combination without conflict, which is not limited in the present disclosure.

According to the voice smart device wake-up method provided in this embodiment, when a user gives a wake-up word, a plurality of smart devices send wake-up messages to the master control device, and the master control device determines the target device to be woken up for responding to a subsequent voice request of the user. In a case where a plurality of smart devices share a same wake-up word, only one most suitable smart device is waken up to respond to a voice request of the user each time. This resolves the problem in the prior art that one wake-up word wakes up multiple smart devices, causing mutual interference between the smart devices which results in poor user experience, and thus effectively improves user experience.

Embodiment 3

This embodiment provides a voice smart device wake-up method, so as to wake up a most suitable target for a user from a plurality of smart devices. The execution body of the present embodiment is a voice smart device wake-up apparatus, where the apparatus may be disposed in the smart device.

Figure 4:
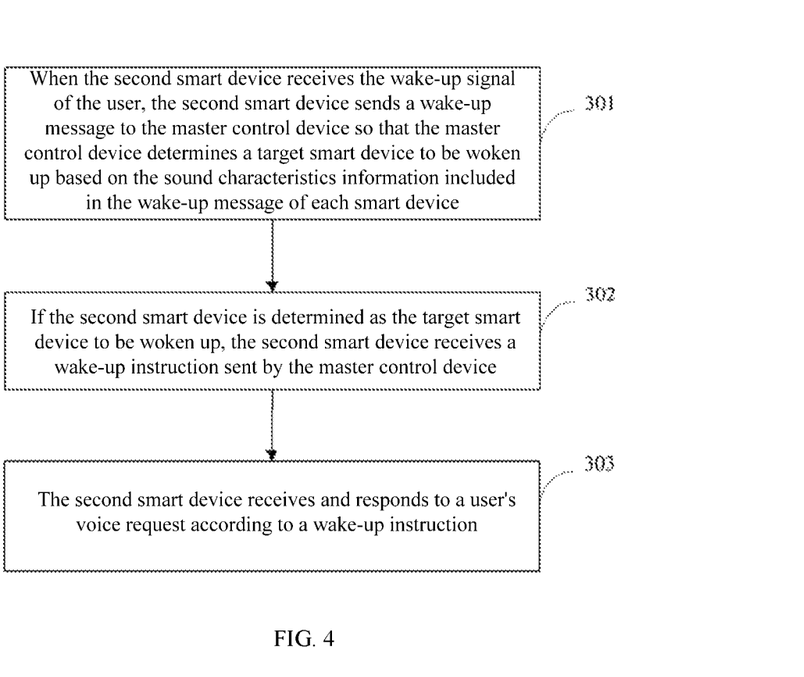
FIG. 4 is a schematic flowchart of a voice smart device wake-up method according to still another embodiment of the present disclosure.

As shown in FIG. 4, which is a schematic flowchart of a voice smart device wake-up method according to an embodiment, the method includes the following steps:

Step 301, when the second smart device receives the wake-up signal of the user, the second smart device sends a wake-up message to the master control device so that the master control device determines a target smart device to be woken up based on the sound characteristics information included in the wake-up message of each smart device.

Step 302, if the second smart device is determined as the target smart device to be woken up, the second smart device receives a wake-up instruction sent by the master control device;

Step 303, the second smart device receives and responds to a user's voice request according to a wake-up instruction.

In particular, a plurality of smart devices may access the same local area network and may have the same wake-up word. One of the smart devices is selected as the master control device in a certain manner, and the other smart devices act as slave control smart devices. When a user issues a wake-up signal, such as speaking a wake-up word, the smart devices (also including the master control device) receiving a wake-up signal of the user are not woken up, that is, the smart devices do not directly respond to the user's voice request, but generate wake-up messages according to the wake-up signal, where the wake-up message includes at least sound characteristics information such as a volume intensity, a distance information and a tone. The volume intensity refers to the volume intensity of the user's wake-up signal received by the smart device, and the volume intensity may represent the distance between the smart device and the user. Distance information refers to information of distance between the smart device and the user determined by the smart device corresponding to the wake-up message according to the wake-up signal sent by the user. For example, one smart device has a high volume intensity and another smart device has a low volume intensity, which may identify that a smart device with a high volume intensity is closer to a user than a smart device with a low volume intensity. The way in which the smart device obtains the volume intensity of the wake-up signal according to the wake-up signal of the user may be any implementation manner in the prior art, and details are not described herein again.

Taking one of the smart devices as an example, for the sake of distinction, the second smart device may be a master control device or may be another smart device.

The second smart device sends the wake-up message to the master control device after generating the wake-up message. The master control device may receive a wake-up message sent by each second smart device. The master control device itself may also serve as a second smart device, equivalent to sending a wake-up message to itself.

After receiving the wake-up message sent by each smart device (including the second smart device), the master control device determines a target smart device to be woken up from the smart devices according to the volume intensity. Specifically, the master control device may select a smart device with a maximum volume intensity as the target smart device to be woken up according to the volume intensity. If the second smart device is determined as the target smart device to be woken up, the master control device sends a wake-up instruction to the second smart device to wake the second smart device. If the target smart device to be woken up is the master control device itself, the master control device may send a wake-up instruction to itself.

After receiving the wake-up instruction, the second smart device receives the user's voice request according to the wake-up instruction and responds to the voice request. Specifically, the second smart device may send the voice request of the user to the cloud server. The cloud server obtains response data according to the voice request of the user and returns the response data to the second smart device. The second smart device plays the response data to the user. For example, the voice request of the user is "How is the weather today?", the cloud server obtains today's weather information and sends the weather information to the second smart device, so that the second smart device plays it to the user. Alternatively, the second smart device may acquire response data according to the voice request of the user and play the response data to the user or perform corresponding setting or processing according to the voice request of the user. For example, the voice request of the user is "Please set the alarm clock to 10 am for me, and the content of the alarm clock is meeting friends", and the second smart device sets the alarm clock according to the voice request of the user, and announces the alarm clock to the user at a specified time.

The playback mode for responding to the user request by the second smart device may be set according to actual requirements, such as displaying on the screen in a text form, playing in a voice form, or playing in a voice form while displaying on the screen, which is not limited in this embodiment.

Alternatively, the master control device may also send a non-wake-up instruction to smart devices other than the second smart device to indicate that the other smart devices not to receive the user's voice request, and not to respond to the user's voice request.

Alternatively, it may be agreed that the smart device will not be woken up as long as no wake-up instruction is received, so that the master control device does not need to send a non-wake-up instruction to other smart devices.

In response to a user's voice request, the request content of the user's voice request may be obtained by using a technology such as voice recognition and semantic recognition, the specific process of which is the prior art, and details thereof are not described in this embodiment.

According to the voice smart device wake-up method provided in this embodiment, when a user gives a wake-up word, a plurality of smart devices send a wake-up message to the master control device, and the master control device determines the second smart device for responding to a subsequent voice request of the user, thereby realizing waking up only one most suitable smart device for responding to the user's voice request in a case where a plurality of smart devices share a same wake-up word. This resolves a problem in the prior art that one wake-up word wakes up multiple smart devices, causing mutual interference between the smart devices which results in poor user experience, and thus effectively improves user experience.

Embodiment 4

In this embodiment, the method provided in the above-described Embodiment 3 is further described.

Figure 5:
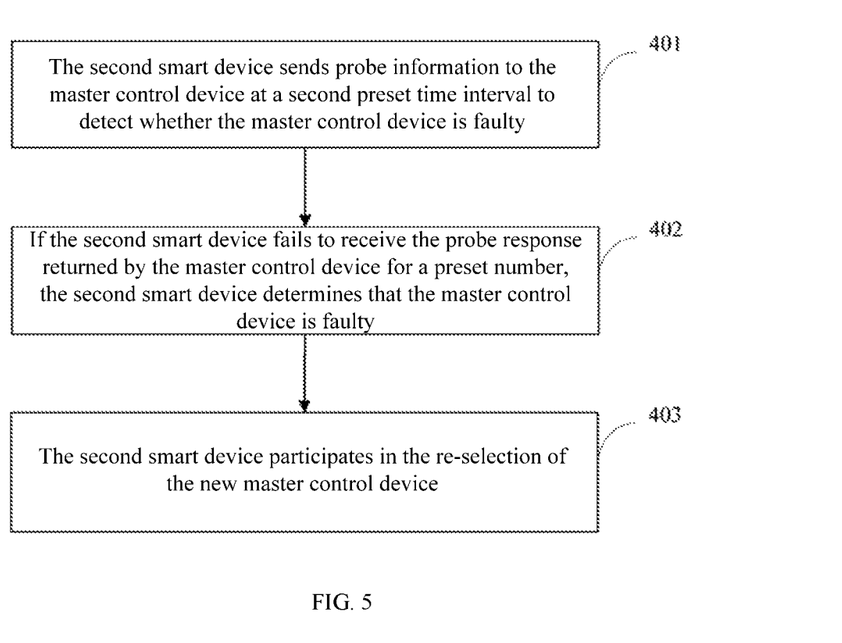
FIG. 5 is a schematic flowchart of a voice smart device wake-up method according to still another embodiment of the present disclosure.

FIG. 5 is a schematic flowchart of a voice smart device wake-up method according to an embodiment.

In an implementable manner, on the basis of the above-described Embodiment 3, alternatively, the method may further include:

Step 401, the second smart device sends probe information to the master control device at a second preset time interval to detect whether the master control device is faulty.

Step 402, if the second smart device fails to receive the probe response returned by the master control device for a preset number, the second smart device determines that the master control device is faulty.

Step 403, the second smart device participates in the re-selection of the new master control device.

Specifically, the master control device is not an invariant, and has a certain period. After selecting a master control device, each smart device (e.g. the second smart device) needs to send detection information to the master control device at a certain time interval (that is, a second preset time interval, such as every 1 second and every 2 seconds, which may be set according to an actual requirement). If a detection response returned by the master control device can be received, it is proved that the master control device works normally. If no probe response is received for a preset number of times (such as three times, four times, five times, etc., which may be set according to an actual requirement), it is considered that the master control device fails, and each smart device needs to re-select a new master control device. The period from selecting a master control device to deeming the master control device as a fault may be referred as a cycle.

Alternatively, the selection of the master control device by each smart device may be performed in a time sequence in which the smart devices are added to the local area network, or may be performed by using a raft algorithm. Specifically, the method of selecting the master control device by using the raft algorithm may be any of the possible implementations in the prior art, which is not limited in this application.

In another possible implementation, on the basis of the above-described Embodiment 3, alternatively, after the second smart device receives the wake-up signal of the user, the method further includes:

The second smart device calculates sound characteristic information of the wake-up signal according to the wake-up signal; The second smart device generates a wake-up message according to the sound characteristics information.

Alternatively, the second smart device calculates the volume intensity of the wake-up signal according to the wake-up signal, and the second smart device generates a wake-up message according to the volume intensity.

Alternatively, the second smart device calculates distance information of the wake-up signal according to the wake-up signal, and the second smart device generates a wake-up message according to the distance information.

Alternatively, the second smart device calculates the volume intensity of the wake-up signal and the distance information between the second smart device and the user according to the wake-up signal; The second smart device generates a wake-up message based on the volume intensity and distance information.

In still another possible implementation, on the basis of the above-described Embodiment 3, alternatively, the second smart device receives and responds to a user's voice request according to a wake-up instruction, including:

receiving, by a second smart device, a voice request from a user; sending, by the second smart device the voice request to the cloud server, so that the cloud server performs voice recognition and semantic recognition on the voice request, obtains request content of the user, and returns response data; receiving, by the second smart device response data returned by the cloud server, and playing the response data.

In still another possible implementation, on the basis of the above-described Embodiment 3, alternatively, after the second smart device receives the wake-up instruction sent by the master control device, the method further includes:

generating, by the second smart device, prompt information to prompt the user that the second smart device is the target smart device to be woken up.

Specifically, after receiving the wake-up instruction, the second smart device needs to generate prompt information to prompt the user that the smart device is woken up, and the user can say the voice request. The manner in which the second smart device displays the prompt information may be a voice broadcast prompt, a light prompt, or a bright screen prompt and etc., which is not limited herein.

In still another possible implementation, on the basis of the above-described Embodiment 3, alternatively, if the second smart device is not determined as the target smart device to be woken up, the second smart device receives the non-wake-up instruction sent by the master control device and does not receive the user's voice request.

It should be noted that the present embodiment is a method executed by an interactive end of the method provided in Embodiment 1 or Embodiment 2, and detailed operations of the steps thereof have been described in detail in Embodiment 1 or Embodiment 2, and details are not described herein again.

It should also be noted that the embodiments of the present disclosure may be implemented separately, and the present disclosure is not limited in any combination without conflict.

According to the voice smart device wake-up method provided in this embodiment, when a user gives a wake-up word, a plurality of smart devices send wake-up messages to the master control device, and the master control device determines the target device to be woken up for responding to a subsequent voice request of the user. In a case where a plurality of smart devices share a same wake-up word, only one most suitable smart device is waken up to respond to a voice request of the user each time. This resolves the problem in the prior art that one wake-up word wakes up multiple smart devices, causing mutual interference between the smart devices which results in poor user experience, and thus effectively improves user experience.

Embodiment 5

This embodiment provides a voice smart device wake-up apparatus, which executes the method of Embodiment 1.

Figure 6:
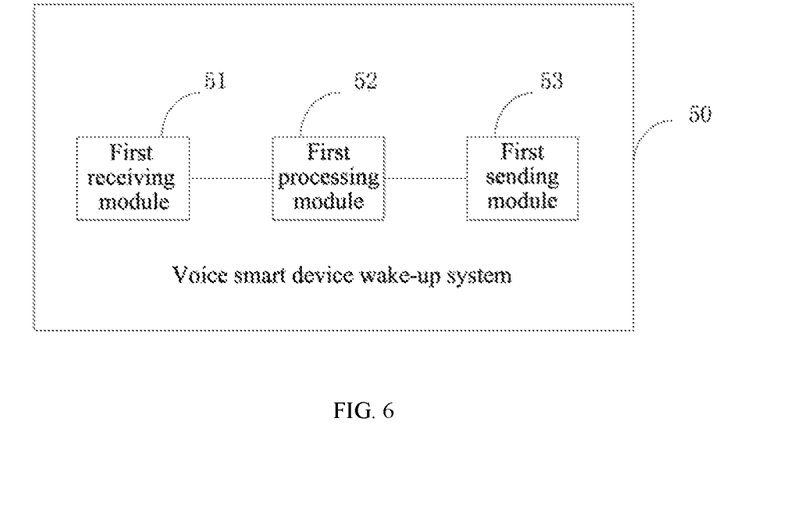
FIG. 6 is a schematic structural diagram of a voice smart device wake-up apparatus according to an embodiment of the present disclosure.

As shown in FIG. 6, FIG. 6 is a schematic structural diagram of a voice smart device wake-up apparatus according to the present embodiment. The apparatus for waking up voice smart device 50 includes a first receiving module 51, a first processing module 52, and a first sending module 53.

Where, the first receiving module 51 is configured for the master control device to receive a wake-up message sent by each smart device, and the wake-up message includes at least sound characteristics information; the first processing module 52 is configured for the master control device to determine the target smart device to be woken up based on the sound characteristics information; the first sending module 53 is configured for the master control device to send a wake-up instruction to the target smart device to be woken up to wake up the target smart device to be woken up in response to a user's voice request.

With respect to the apparatus of the present embodiment, a specific manner in which each module performs an operation has been described in detail in embodiments of the method, which will not be described in detail herein.

According to the method for waking up voice smart device provided in this embodiment, when a user gives a wake-up word, a plurality of smart devices send wake-up messages to the master control device, and the master control device determines the target device to be woken up for responding to a subsequent voice request of the user. In a case where a plurality of smart devices share a same wake-up word, only one most suitable smart device is waken up to respond to a voice request of the user each time. This resolves the problem in the prior art that one wake-up word wakes up multiple smart devices, causing mutual interference between the smart devices which results in poor user experience, and thus effectively improves user experience.

Embodiment 6

In this embodiment, the apparatus provided in Embodiment 5 is further described to perform the method provided in Embodiment 2.

In an implementable manner, on the basis of Embodiment 5, alternatively, the first receiving module is further configured for the master control device to receive the probe information sent by each smart device, the first sending module is further configured for the master control device to return a probe response to each smart device.

Alternatively, the first processing module is further configured to: if probe information of a first smart device is not received within a first preset time interval, the master control device deletes related information of the first smart device from the maintained device list.

Alternatively, the first processing module is further configured to: if the probe information sent by the first smart device is received again, the master control device re-adds the related information of the first smart device to the device list.

In another possible implementation, on the basis of Embodiment 5, alternatively, the sound characteristic information includes distance information, which is the information of distance between the user and the smart device corresponding to the wake-up message determined by the smart device itself according to the wake-up signal sent by the user. The first processing module is further configured to determine, by the master control device, the target smart device to be woken up according to the distance information.

In another possible implementation, on the basis of the above-described Embodiment 5, alternatively, the sound characteristic information includes a volume intensity. the first processing module is further configured to determine, by the master control device, the target smart device to be woken up according to the volume intensity.

In yet another possible implementation, on the basis of the above-described Embodiment 5, the first sending module is further configured to send, by the master control device, a non-wake-up instruction to the other smart devices to indicate not to wake up the other smart devices.

Alternatively, since the master control device in the network is not always fixed, each smart device in the network may become the master control device, thus each smart device may be provided with the apparatus.

With respect to the apparatus of the present embodiment, a specific manner in which each module performs an operation has been described in detail in the embodiment of the method, which will not be described in detail herein.

It should be noted that, each possible implementation in this embodiment may be implemented separately, and can be implemented in any combination to perform the present disclosure if there's no conflict.

According to the voice smart device wake-up apparatus of the present embodiment, when the user speaks the wake-up word, multiple smart devices send wake-up messages to a master control device, and the master control device determines a target smart device to be woken up for responding to a subsequent voice request of the user. In a case in which the multiple smart devices share a same wake-up word, only one most suitable smart device is woken up for responding to the voice request of the user each time. This resolves a problem in the prior art that one wake-up word wakes up multiple smart devices, resulting in problems of mutual interference between the smart devices and the relative poor user experience, thereby effectively improving user experience.

Embodiment 7

The present embodiment provides a wake-up apparatus of a voice smart device for executing the method of the third embodiment.

Figure 7:
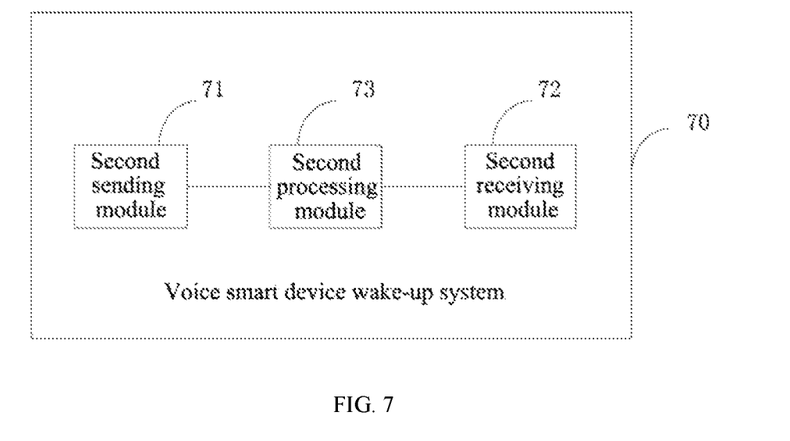
FIG. 7 is a schematic structural diagram of a voice smart device wake-up apparatus according to another embodiment of the present disclosure.

As shown in FIG. 7, FIG. 7 is a schematic structural diagram of a voice smart device wake-up apparatus according to the present embodiment. The voice smart device wake-up apparatus 70 includes a second sending module 71, a second receiving module 72, and a second processing module 73.

The second sending module 71 is configured to for the second smart device to: when the second smart device receives the wake-up signal of the user, send a wake-up message to the master control device so that the master control device determines a target smart device to be woken up based on the sound characteristics information included in the wake-up message of each smart device. The second receiving module 72 is configured for the second smart device to: if the second smart device is determined as the target smart device to be woken up, receive a wake-up instruction sent by the master control device. The second processing module 73 is configured for the second smart device to receive and respond to a user's voice request according to a wake-up instruction.

With respect to the apparatus of the present embodiment, a specific manner in which each module performs an operation has been described in detail in the embodiment of the method, which will not be described in detail herein.

According to the voice smart device wake-up apparatus provided in the present embodiment, when a user gives a wake-up word, a plurality of smart devices send a wake-up message to the master control device, and the master control device determines the second smart device for responding to a subsequent voice request of the user, thereby realizing waking up only one most suitable smart device for responding to the user's voice request in a case where a plurality of smart devices share a same wake-up word. This resolves a problem in the prior art that one wake-up word wakes up multiple smart devices, causing mutual interference between the smart devices which results in poor user experience, and thus effectively improves user experience.

Embodiment 8

In this embodiment, the apparatus provided in above-described Embodiment 7 is further described to perform the method provided in the above-described Embodiment 4.

In an implementable manner, on the basis of the above-described Embodiment 5, alternatively, the second sending module is further configured for the second smart device to send probe information to the master control device at a second preset time interval to detect whether the master control device is faulty. The second processing module is further configured for the second smart device to send probe information to the master control device at a second preset time interval to detect whether the master control device is faulty. The second processing module is further configured for the second smart device to participate in the re-selection of the new master control device.

In another possible implementation, on the basis of the above-described Embodiment 5, alternatively, the second processing module is further configured for the second smart device to:

calculate sound characteristic information of the wake-up signal according to the wake-up signal, and generate a wake-up message according to the sound characteristics information.

Alternatively, the second smart device calculates the volume intensity of the wake-up signal and the distance information between the second smart device and the user according to the wake-up signal; The second smart device generates a wake-up message based on the volume intensity and distance information.

Alternatively, the second smart device calculates the volume intensity of the wake-up signal according to the wake-up signal, and the second smart device generates a wake-up message according to the volume intensity.

Alternatively, the second smart device calculates distance information of the wake-up signal according to the wake-up signal, and the second smart device generates a wake-up message according to the distance information.

In still another possible implementation, on the basis of the above-described Embodiment 5, alternatively, the second processing module is specifically configured to the second smart device to:

receive a voice request from a user; send the voice request to the cloud server, so that the cloud server performs voice recognition and semantic recognition on the voice request, obtains request content of the user and returns response data; receive response data returned by the cloud server, and play the response data.

In still another possible implementation, on the basis of the above-described Embodiment 5, alternatively, the second processing module is further configured for the second smart device to generate prompt information to prompt the user that the second smart device is the target smart device to be woken up.

In still another possible implementation, on the basis of the above-described Embodiment 5, alternatively, the second receiving module is further configured for the second smart device to:

if the second smart device is not determined as the target smart device to be woken up, receive a non-wake-up instruction sent by the master control device and does not receive a user's voice request.

With respect to the apparatus of the present embodiment, a specific manner in which each module performs an operation has been described in detail in the embodiment of the method, which will not be described in detail herein.

It should be noted that, each possible implementation in this embodiment may be implemented separately, and can be implemented in any combination to perform the present disclosure if there's no conflict.

According to the voice smart device wake-up apparatus of the present embodiment, when a user gives a wake-up word, a plurality of smart devices send wake-up messages to the master control device, and the master control device determines the target device to be woken up for responding to a subsequent voice request of the user. In a case where a plurality of smart devices share a same wake-up word, only one most suitable smart device is waken up to respond to a voice request of the user each time. This resolves the problem in the prior art that one wake-up word wakes up multiple smart devices, causing mutual interference between the smart devices which results in poor user experience, and thus effectively improves user experience.

Embodiment 9

The present embodiment provides a smart device for executing the method provided in Embodiment 1 or Embodiment 2, the smart device the above-described master control device.

Figure 8:
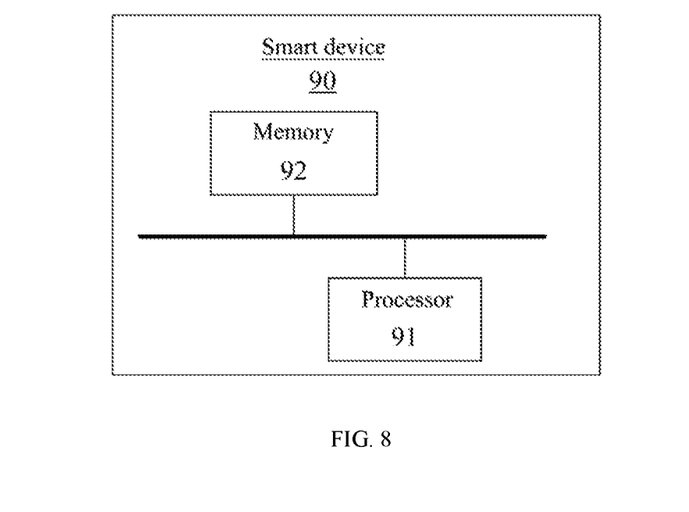
FIG. 8 is a schematic structural diagram of a smart device according to an embodiment of the present disclosure.

As shown in FIG. 8, FIG. 8 is a schematic structural diagram of a smart device according to the present embodiment. The smart device 90 includes at least one processor 91 and memory 92;

The memory stores a computer program; the at least one processor executes the computer program stored in the memory to implement the method provided in the above-described embodiments.

According to the smart device of the present embodiment, when a user gives a wake-up word, a plurality of smart devices send wake-up messages to the master control device, and the master control device determines the target device to be woken up for responding to a subsequent voice request of the user. In a case where a plurality of smart devices share a same wake-up word, only one most suitable smart device is waken up to respond to a voice request of the user each time. This resolves the problem in the prior art that one wake-up word wakes up multiple smart devices, causing mutual interference between the smart devices which results in poor user experience, and thus effectively improves user experience.

Embodiment 10

This embodiment provides a smart device for performing the method provided in Embodiment 3 or Embodiment 4.

Figure 9:
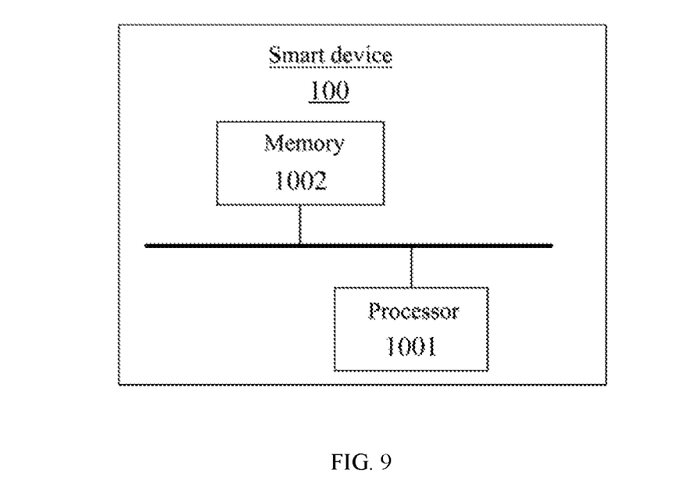
FIG. 9 is a schematic structural diagram of a smart device according to another embodiment of the present disclosure.

As shown in FIG. 9, FIG. 9 is a schematic structural diagram of a smart device according to the present embodiment. The smart device 100 includes a processor 1001 and a memory 1002.

The memory stores a computer program. The processor executes the computer program stored in the memory to implement the method provided in Embodiment 3 or Embodiment 4.

According to the smart device of the present embodiment, when a user gives a wake-up word, a plurality of smart devices send wake-up messages to the master control device, and the master control device determines the target device to be woken up for responding to a subsequent voice request of the user. In a case where a plurality of smart devices share a same wake-up word, only one most suitable smart device is waken up to respond to a voice request of the user each time. This resolves the problem in the prior art that one wake-up word wakes up multiple smart devices, causing mutual interference between the smart devices which results in poor user experience, and thus effectively improves user experience.

Embodiment 11

This embodiment provides a computer readable storage medium in which a computer program is stored, and the method provided in Embodiment 1 or Embodiment 2 is implemented when the computer program is executed.

According to the computer readable storage medium of the present embodiment, when a user gives a wake-up word, a plurality of smart devices send wake-up messages to the master control device, and the master control device determines the target device to be woken up for responding to a subsequent voice request of the user. In a case where a plurality of smart devices share a same wake-up word, only one most suitable smart device is waken up to respond to a voice request of the user each time. This resolves the problem in the prior art that one wake-up word wakes up multiple smart devices, causing mutual interference between the smart devices which results in poor user experience, and thus effectively improves user experience.

Embodiment 12

This embodiment provides a computer readable storage medium in which a computer program is stored, and the method provided in Embodiment 3 or Embodiment 4 is implemented when the computer program is executed.

According to the computer readable storage medium of the present embodiment, when a user gives a wake-up word, a plurality of smart devices send wake-up messages to the master control device, and the master control device determines the target device to be woken up for responding to a subsequent voice request of the user. In a case where a plurality of smart devices share a same wake-up word, only one most suitable smart device is waken up to respond to a voice request of the user each time. This resolves the problem in the prior art that one wake-up word wakes up multiple smart devices, causing mutual interference between the smart devices which results in poor user experience, and thus effectively improves user experience.

In several embodiments provided in the present disclosure, it should be understood that the disclosed devices and methods may be implemented in other manners. For instance, the described device embodiments are merely exemplary. For instance, the division of the units is merely a division of logical functions and there may be other divisions during actual implementations. For instance, multiple units or components may be combined or integrated into another system, or some features may be omitted or not performed. In addition, the displayed or discussed mutual couplings or direct couplings or communication connections may be implemented via some interfaces. The indirect couplings or communication connections between the devices or units may be implemented in electronic, mechanical, or other forms.

The units described as separate parts may or may not be physically separate, and parts shown as units may or may not be physical units, that is, may be located in one position, or may be distributed on multiple network units. A part or all of the units may be selected according to actual needs to achieve the objectives of the scheme in the embodiments.

In addition, functional units in the embodiments of the present disclosure may be integrated into one processing unit, or each of the units may exist alone physically, or two or more units are integrated into one unit. The above integrated unit may be implemented in a form of hardware or in a form of hardware plus software functional units.

The integrated unit implemented in the form of a software functional unit as described above may be stored in a computer readable storage medium. The software functional unit is stored in a storage medium, and includes several commands for enabling a computer device (which may be a personal computer, a server, or a network device, etc.) or a processor to perform a part of steps of the method described in the embodiments of the present disclosure. The foregoing storage medium includes: any medium that can store program codes, such as a USB flash disk, a mobile hard disk, a Read-Only Memory (ROM), a Random Access Memory (RAM), a magnetic disk, or an optical disc, etc.

It may be clearly understood by persons skilled in the art that, for the purpose of convenient and brief description, division of the described functional modules is merely described for illustrations, in practical use, the described functions may be assigned as desired to different functional modules for implementations, that is, the internal structure of the device is divided into different functional modules to implement all or a part of functions as described above. For a detailed working process of the described devices, reference may be made to corresponding processes in the foregoing method embodiments, for which details will be omitted herein.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present disclosure.

What is claimed is:

1. A voice smart device wake-up method, comprising:
 a) receiving, by a master control device selected from a plurality of smart devices, a wake-up message sent by other smart devices than the master control device of the plurality of smart devices, wherein the wake-up message is generated by each of the other smart devices after receiving a same wake-up signal, and the wake-up message comprises at least sound characteristics information of the same wake-up signal received by the each of the other smart devices,
 b) determining, by the master control device, a target smart device to be woken up according to the sound characteristics information in the wake-up message, and
 c) sending, by the master control device, a wake-up instruction to the target smart device to be woken up, to wake up the target smart device to be woken up for responding to a voice request from a user,
 wherein the method further comprises:
 receiving, by the master control device, probe information sent by each of the other smart devices and returning probe responses to each of the other smart devices, wherein the probe information is sent to the master control device at a second preset time interval to detect whether the master control device is faulty, each of the other smart devices determines that the master control device is faulty if the probe responses returned by the master control device are not received for a preset number of times, and the each of the other smart devices participates in re-selection of a new master control device.

2. The method of claim 1, further comprising: deleting, by the master control device, related information of a first smart device from a maintained device list, if the probe information from a first smart device is not received within a first preset time interval.

3. The method according to claim 2, wherein, after the deleting, by the master control device, the related information of the first smart device from the maintained device list, further comprising: re-adding, by the master control device, the related information of the first smart device to the device list if the probe information sent by the first smart device is received again.

4. The method of claim 1, wherein the sound characteristic information comprises a volume intensity or distance information, wherein the distance information is distance information determined by each of the other smart devices corresponding to the wake-up message according to the same wake-up signal sent by the user, the determining, by the master control device, the target smart device to be woken up according to sound characteristics information in the wake-up message, comprising: determining, by the master control device, the target smart device to be woken up according to the volume intensity or the distance information.

5. The method of claim 1, after the determining, by the master control device, the target smart device to be woken up according to sound characteristics information in the wake-up message, further comprising: sending, by the master control device, a non-wake-up instruction to other smart devices than the target smart device to be woken up to indicate not to wake up the other smart devices.

6. A voice smart device wake-up method, comprising:
a) generating, by a second smart device of a plurality of smart devices, a wake-up message based on a wake-up signal received from a user, and sending the wake-up message to a master control device selected from the plurality of smart devices, so that the master control device determines a target smart device to be woken up based on sound characteristics information of the same wake-up signal comprised in wake-up messages from smart devices other than the master control device of the plurality of smart devices,
b) receiving, by the second smart device, a wake-up instruction sent by the master control device if the second smart device is determined as the target smart device to be woken up, and
c) receiving and responding to, by the second smart device, a voice request from the user according to the wake-up instruction,
wherein the method further comprises:
sending, by the second smart device, probe information to the master control device at a second preset time interval to detect whether the master control device is faulty;
determining, by the second smart device, that the master control device is faulty if probe responses returned by the master control device are not received for a preset number of times; and
participating, by the second smart device, in re-selection of a new master control device.

7. The method of claim 6, wherein the generating, by the second smart device, the wake-up message based on the wake-up signal received from the user further comprises: calculating, by the second smart device, sound characteristic information of the wake-up signal according to the wake-up signal, generating, by the second smart device, the wake-up message based on the sound characteristics information.

8. The method of claim 6, wherein the receiving and responding to, by the second smart device, the voice request from the user according to the wake-up instruction comprises: receiving, by the second smart device, a voice request from the user, sending, by the second smart device, the voice request to a cloud server, so that the cloud server performs voice recognition and semantic recognition on the voice request, obtains request content of the user, and returns response data, receiving, by the second smart device, the response data returned by the cloud server, and playing the response data.

9. The method of claim 6, after the receiving, by the second smart device, the wake-up instruction sent by the master control device, further comprising: generating, by the second smart device, prompt information to prompt the user that the second smart device is the target smart device to be woken up.

10. The method of claim 6, further comprising: receiving, by the second smart device, a non-wake-up instruction sent by the master control device and not receiving the voice request from the user, if the second smart device is not determined as the target smart device to be woken up.

11. A voice smart device wake-up apparatus, applied in a master control device selected from a plurality of smart devices, and the voice smart device wake-up apparatus comprising: a memory, a processor and a computer program stored on the memory and executable on the processor,
wherein the processor, when running the computer program, is configured to:
a) receive a wake-up message sent by other smart devices than the master control device of the plurality of smart devices, wherein the wake-up message is generated by each of the other smart devices after receiving a same wake-up signal, and the wake-up message comprises at least sound characteristics information of the same wake-up signal received by the each of the other smart devices,
b) determine a target smart device to be woken up according to the sound characteristics information in the wake-up message, and
c) send a wake-up instruction to the target smart device to be woken up, to wake up the target smart device to be woken up for responding to a voice request from a user,
wherein the processor is further configured to receive probe information sent by each of the other smart devices and return probe responses to each of the other smart devices, wherein the probe information is sent to the master control device at a second preset time interval to detect whether the master control device is faulty, each of the other smart devices determines that the master control device is faulty if the probe responses returned by the master control device are not received for a preset number of times, and each of the other smart devices participates in re-selection of a new master control device.

12. The apparatus of claim 11, wherein the processor is further configured to delete related information of a first smart device from a maintained device list, if the probe information from a first smart device is not received within a first preset time interval.

13. The apparatus of claim 12, wherein the processor is further configured to re-add the related information of the first smart device to the device list if the probe information sent by the first smart device is received again.

14. The apparatus of claim 11, wherein the sound characteristic information comprises a volume intensity or distance information, which is distance information determined by the each of the other smart devices corresponding to the wake-up message according to the same wake-up signal sent by the user, and the processor is further configured to determine the target smart device to be woken up according to the volume intensity or the distance information.

15. The apparatus of claim 11, wherein the processor is further configured to send a non-wake-up instruction to other smart devices than the target smart device to be woken up to indicate the other smart devices not to wake up.

16. A voice smart device wake-up apparatus, applied in a second smart device of a plurality of smart devices, comprising: a memory, a processor and a computer program stored on the memory and executable on the processor,
wherein the processor, when running the computer program, is configured to:
a) generate a wake-up message based on a wake-up signal received from a user, and send the wake-up message to a master control device selected from the plurality of smart devices, so that the master control device determines a target smart device to be woken up based on sound characteristics information of the same wake-up signal comprised in the wake-up message from other smart devices than the master control device of the plurality of smart devices,
b) receive a wake-up instruction sent by the master control device if the second smart device is determined as the target smart device to be woken up, and
c) receive and respond to a voice request from the user according to the wake-up instruction,
wherein the processor is further configured to send probe information to the master control device at a second preset time interval to detect whether the master control device is faulty, the processor is further configured to determine that the master control device is faulty if probe responses returned by the master control device is not received for a preset number of times, and the processor is further configured to participate in re-selection of a new master control device.

17. The apparatus of claim 16, wherein the processor is further configured to: calculate sound characteristic information of the wake-up signal according to the wake-up signal, and generate the wake-up message based on the sound characteristics information.

18. The apparatus of claim 16, wherein the processor is specifically configured to: receive a voice request from the user, send the voice request to a cloud server, so that the cloud server performs voice recognition and semantic recognition on the voice request, obtains request content of the user, and returns response data, receive the response data returned by the cloud server, and play the response data.

19. The apparatus of claim 16, wherein the processor is further configured to generate prompt information to prompt the user that the second smart device is the target smart device to be woken up.

20. The apparatus of claim 16, wherein the processor is further configured to receive a non-wake-up instruction sent by the master control device and not to receive the voice request from the user, if the second smart device is not determined as the target smart device to be woken up.

* * * * *